(12) United States Patent  
Chen

(10) Patent No.: US 6,644,762 B1  
(45) Date of Patent: Nov. 11, 2003

(54) COMPUTER ENCLOSURE WITH DRIVE BRACKET

(75) Inventor: Yun-Lung Chen, Tu-chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/191,590

(22) Filed: Jul. 8, 2002

(30) Foreign Application Priority Data

Jun. 6, 2002 (TW) ....................................... 91208385 U

(51) Int. Cl.[7] .............................................. H05K 7/18
(52) U.S. Cl. .................................... 312/223.2; 361/383
(58) Field of Search ........................... 312/223.2, 223.1, 312/257.1, 263; 361/383, 384, 385, 386, 724, 725; 248/694

(56) References Cited

U.S. PATENT DOCUMENTS

| | | | | |
|---|---|---|---|---|
| 5,306,076 A | * | 4/1994 | Tyler | 303/118.1 |
| 5,447,367 A | * | 9/1995 | Wei | 312/223.2 |
| 6,053,586 A | * | 4/2000 | Cook et al. | 312/223.2 |
| 6,375,288 B1 | * | 4/2002 | Chen | 312/223.2 |
| 6,498,723 B1 | * | 12/2002 | Konshak et al. | 361/685 |

OTHER PUBLICATIONS

U. S. patent application Publication No. Us 2002/0185944 A1, to Chen, Publication Date Dec. 12, 2002.*

* cited by examiner

*Primary Examiner*—Ramon O Ramirez  
(74) *Attorney, Agent, or Firm*—Wei Te Chung

(57) ABSTRACT

A computer enclosure includes a front panel (10) defining two openings (11, 12) and having a plurality of clips (14), and a pair of drive brackets (20, 30). The clips extend inwardly from the front panel adjacent the openings, and a projection (141) is formed on each clip. The drive brackets each comprise a top panel (23), a bottom panel (21, 31), and a side panel (22, 32). An edge portion of each of these panels nearest the front plate has a plurality of bent plates (24, 34). Each bent plate bar one defines a pair of slots (25, 35). A plurality of recessed portions (26, 36) each defining a cutout (261) is formed in the drive brackets, respectively corresponding to the slots. The clips are received in the slots, and engaged with the corresponding recessed portions. The drive brackets are thereby securely attached to the front panel.

14 Claims, 5 Drawing Sheets

COMPUTER ENCLOSURE WITH DRIVE BRACKET

BACKGROUND OF THE INVENTION

1. Field of the Invention

The present invention relates to a computer enclosure, and in particular to a computer enclosure which has a drive bracket readily attached therein.

2. Related Art

When a conventional computer is assembled, a drive bracket is firstly mounted in a computer enclosure. Data storage devices such as a hard disk drive (HDD), a floppy disk drive (FDD) and a compact disk read only memory (CD-ROM) drive are then attached to the drive bracket.

A drive bracket is typically secured to a computer enclosure by riveting or using a plurality of screws. U.S. Pat. No. 5,447,367 discloses a conventional drive bracket, which is attached to a computer enclosure with screws. A screwdriver is required. This is inconvenient and time-consuming, and particularly costly in mass production facilities. Furthermore, during assembly, extra operation space for manipulating the screws is needed. This militates against the modern trend toward reducing the size of a computer. Similar problems are experienced when rivets are used instead of screws. A riveter is required, and extra operation space for manipulating the rivets is needed.

Thus an improved computer enclosure which overcomes the above-mentioned problems is desired.

SUMMARY OF THE INVENTION

Accordingly, an object of the present of invention is to provide a computer enclosure in which a drive bracket is readily attached.

Another object of the present invention is to provide a computer enclosure which does not require additional fasteners to secure a drive bracket therein.

To achieve the above-mentioned objects, a computer enclosure in accordance with a preferred embodiment of the present invention includes a front panel, a first drive bracket and a second drive bracket. A first opening and a second opening are defined in the front plate, corresponding to the first and second drive brackets. A plurality of clips extends inwardly from the front panel adjacent the first and second openings. A projection is formed on a middle portion of each clip. The first and second drive brackets each comprise a top panel, a bottom panel and a side panel. An edge portion of each of these panels nearest the front plate is bent vertically to respectively form a plurality of bent plates. Each bent plate defines a pair of slots; except the bent plate of the bottom panel of the first drive bracket, which defines a pair of gateways. A plurality of recessed portions is formed in the panels of the first and second drive brackets, respectively corresponding to the slots of the bent plates. Each recessed portion defines a cutout therein. The clips of the front plate are received in the slots of the first and second drive brackets, and engaged with the corresponding recessed portions of the first and second drive brackets. The first and second drive brackets are thereby securely attached to the front panel.

Other objects, advantages and novel features of the present invention will be drawn from the following detailed description of preferred embodiments of the present invention with attached drawings, in which:

DESCRIPTION OF THE PREFERRED EMBODIMENTS

Figures 1, 2:
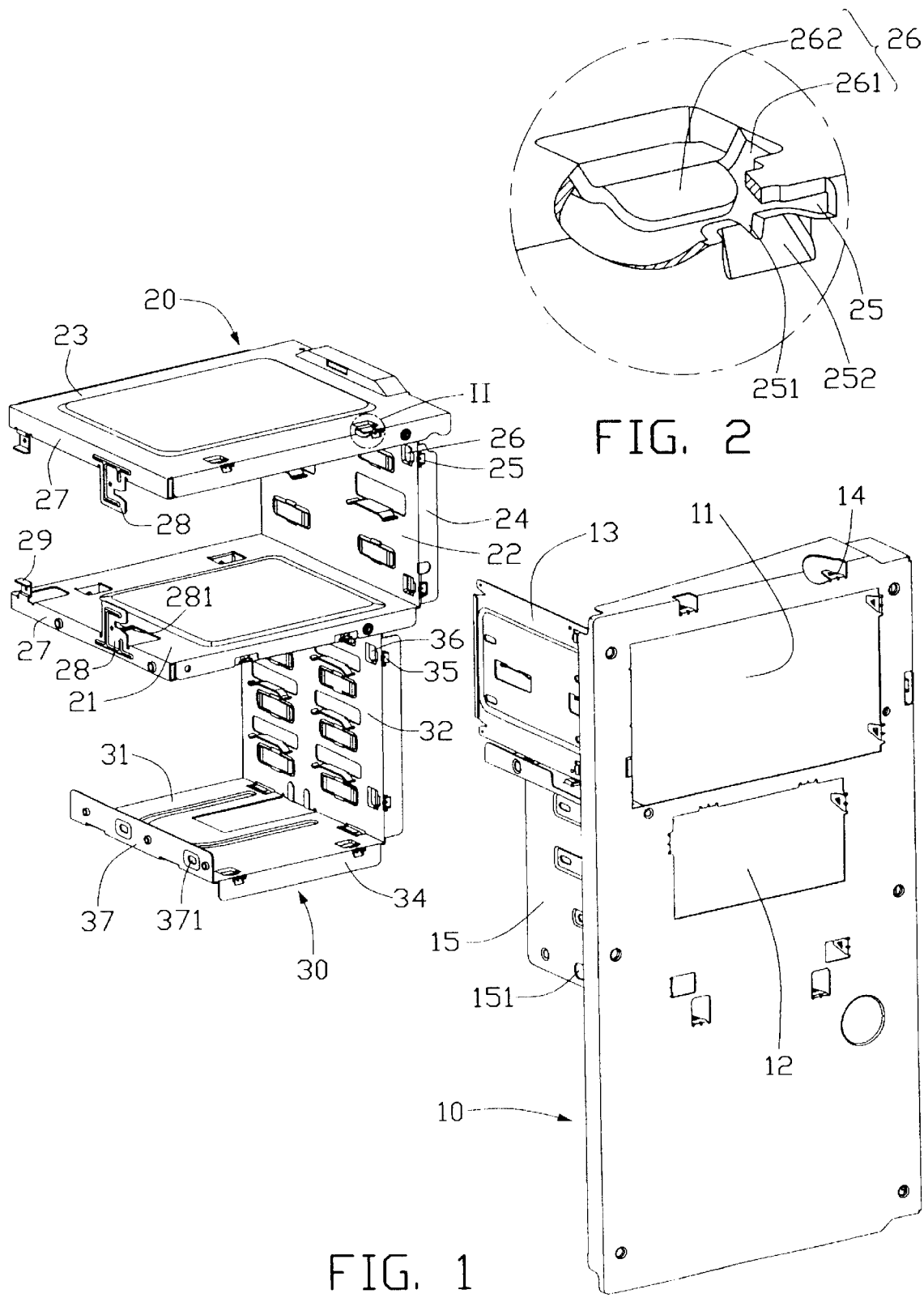
FIG. 1 is an exploded isometric view of a computer enclosure with two drive brackets in accordance with a preferred embodiment of the present invention.
FIG. 2 is an enlarged view of a circled portion II of FIG. 1.

Referring to FIGS. 1 and 2, a computer enclosure in accordance with a preferred embodiment of the present invention includes a front panel 10 for attaching to a chassis (not shown) of a computer (not shown), a first drive bracket 20, and a second drive bracket 30.

Figure 5:
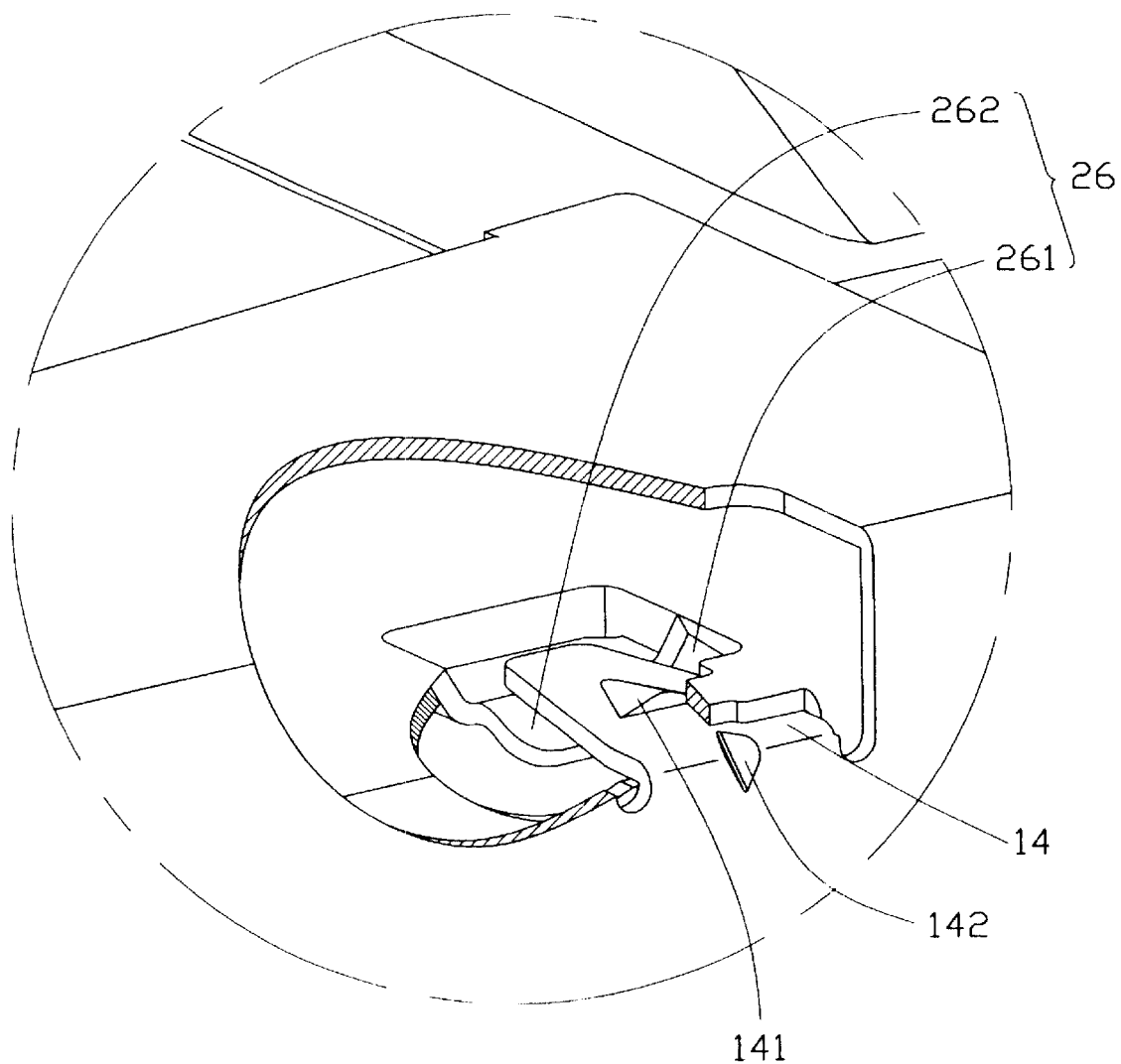
FIG. 5 is an enlarged view of a circled portion V of FIG. 4.

The front panel 10 defines a first opening 11 in a top portion thereof, and a second opening 12 below the first opening 11. A first vertical plate 13 extends rearwardly from the front panel 10 adjacent one side extremity of the first opening 11. A pair of clasps 131 is outwardly formed from top and bottom portions of the first vertical plate 13 respectively. A pair of second notches 132 is defined in top and bottom rearmost portions of the first vertical plate 13 respectively. A second vertical plate 15 extends rearwardly from the front panel 10 generally adjacent one side extremity of the second opening 12 and below the first vertical plate 13. A pair of spaced apertures 151 is defined in a bottom portion of the second vertical plate 15. A plurality of trapezoid clips 14 extends inwardly from the front panel 10 adjacent the first opening 11 and second opening 12. In the preferred embodiment, the clips are arranged adjacent an opposite side extremity and a top extremity of the first opening 11, and adjacent an opposite side extremity and top and bottom extremities of the second opening 12. Referring also to FIG. 5, each clip 14 forms a triangular projection 141 on a middle portion thereof, and a protrusion 142 in a proximal end thereof.

The first drive bracket 20 comprises a first bottom panel 21, a first top panel 23, and a first side panel 22 extending vertically between the first bottom and top panels 21, 23. The first bottom, top and side panels 21, 23, 22 cooperatively define a space (not labeled) therebetween for receiving disk drives (not shown).

Figure 3:
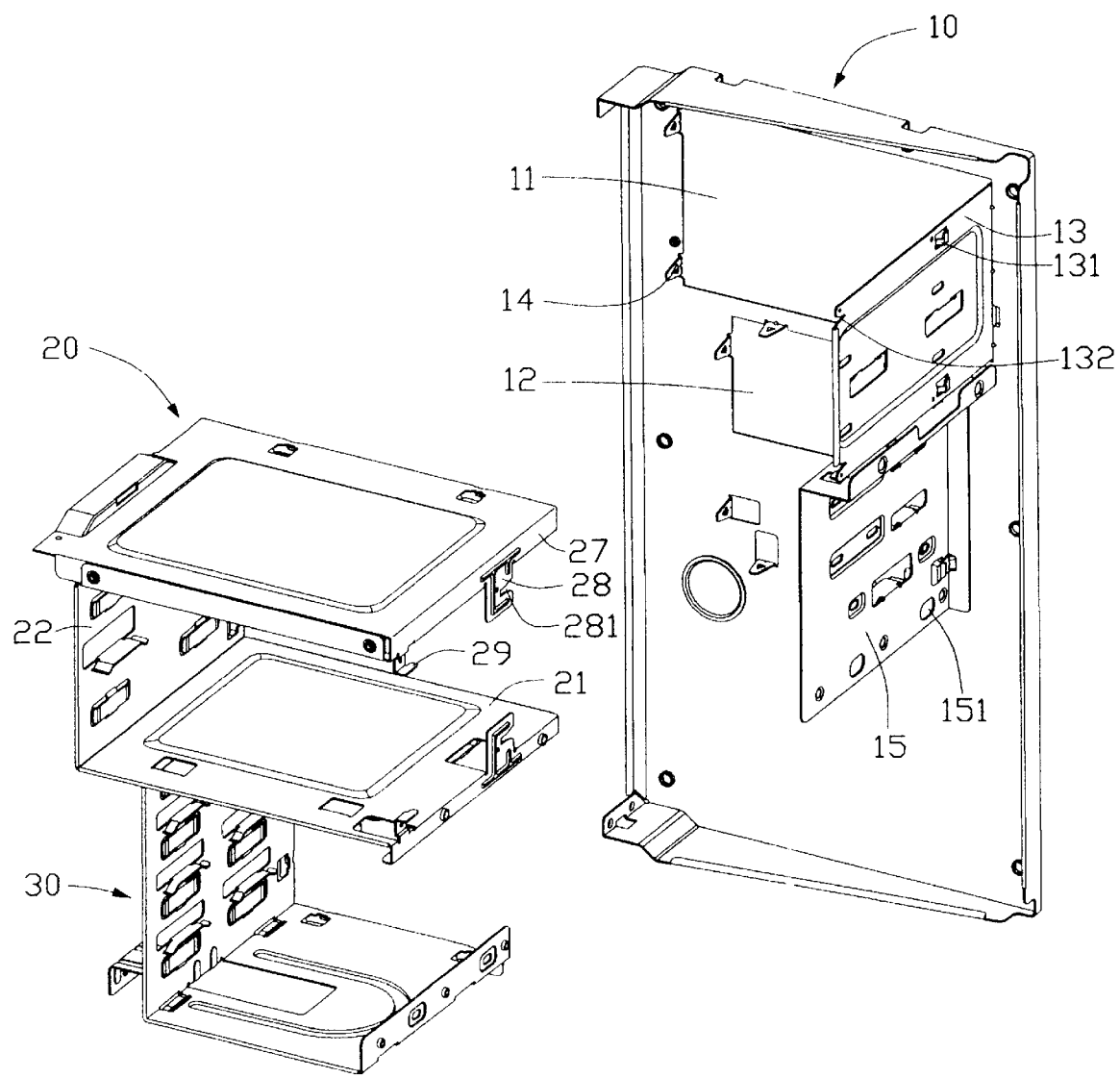
FIG. 3 is similar to FIG. 1, but viewed from another aspect.

Also referring to FIG. 3, a bent plate 24 extends perpendicularly from respective front ends of each of the first bottom, top and side panels 21, 23, 22. A pair of spaced slots 25 is defined in the bent plates 24 of each of the first top panel 23 and first side panel 22, corresponding to the clips 14 adjacent the first opening 11 of the front panel 10. The bent plate 24 at each slot 25 is stamped inwardly to form a slanted portion 252, for facilitating the insertion of the corresponding clip 14 into the slot 25. A V-shaped first notch 251 is defined in a middle of a free edge of the slanted portion 252. A portion of each of the first top panel 23 and first side panel 22 near each slot 25 is stamped to form a recessed portion 26. A cutout 261 is defined in one end of each recessed portion 26 that is nearest the bent plate 24. A guide slant 262 of the recessed portion 26 extends into the cutout 261. A pair of spaced gateways (not labeled) is defined in the bent plate 24 of the first bottom panel 21.

A pair of flanges 27 depends from respective free edges of each of the first bottom and top panels 21, 23 which are distal from the first side panel 22. A pair of catch plates 28 extends coplanarly from middle portions of the flanges 27 respectively, in opposite directions toward each other. A horizontal groove 281 is defined in a front portion of each catch plate 28, for engagingly receiving a corresponding clasp 131 of the first vertical plate 13. A pair of latches 29 extends from rear portions of the flanges 27 respectively, in opposite directions generally toward each other. The latches 29 are for engaging in the second notches 132 of the first vertical plate 13.

The second drive bracket 30 is located below the first drive bracket 20, and comprises a second top panel (not visible), a second side panel 32 and a second bottom panel 31. The second top panel, second side panel 32 and second bottom panel 31 each have a bent plate 34, slots 35 and recessed portions 36. The bent plates 34, slots 35 and recessed portions 36 are configured similarly to the bent plates 24, slots 25 and recessed portions 26 of the first drive bracket 20. (Note that in FIG. 1 the bent plate 34 of the second top panel is obscured by the bent plate 24 of the first bottom panel 21 of the first drive bracket 20.) A flange 37 extends upwardly from a free edge of the second bottom panel 31 which is distal from the second side panel 32. A pair of hooks 371 is outwardly formed from the flange 37.

Figure 4:
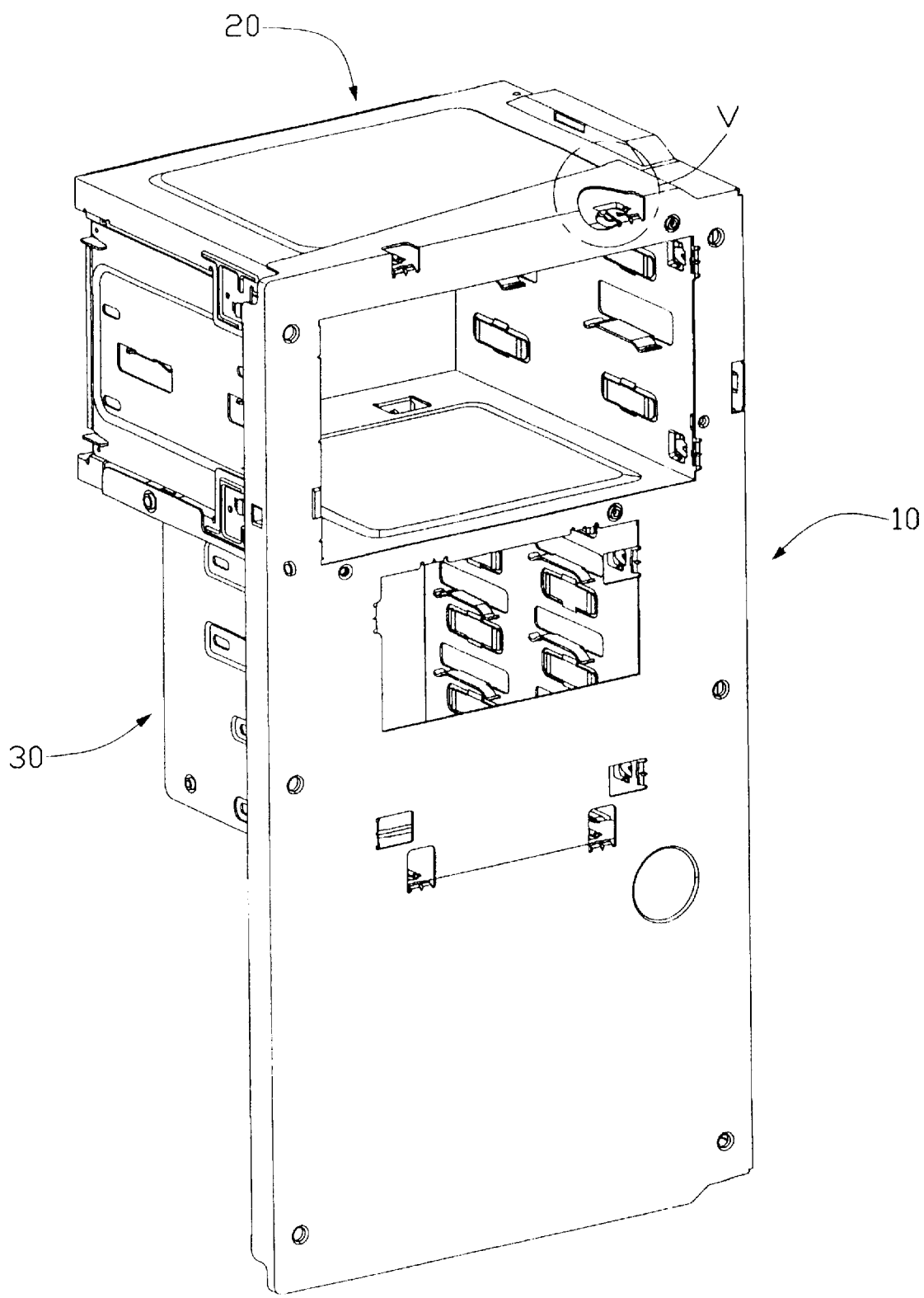
FIG. 4 is an assembled view of FIG. 1.
Figure 6:
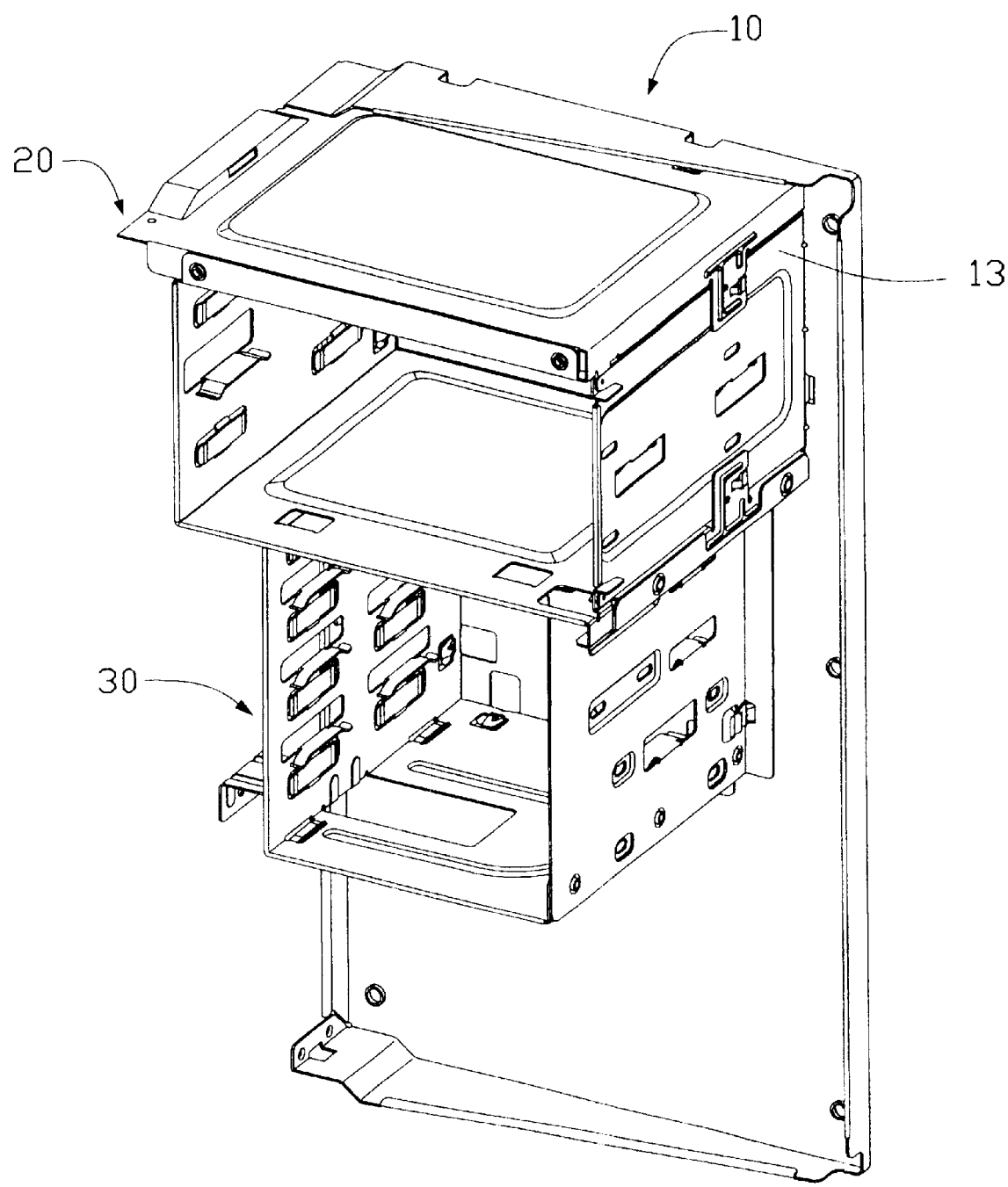
FIG. 6 is a similar to FIG. 4, but viewed from another aspect.

Referring to FIGS. 4–6, in assembly, the first and second drive brackets 20, 30 are placed adjacent the first and second openings 11, 12 respectively of the front panel 10. The first and second drive brackets 20, 30 are pushed forwardly. The catch plates 28 of the first drive bracket 20 engage with the clasps 131 of the first vertical plate 13 of the front panel 10. The latches 29 of the first drive bracket 20 engage in the second notches 132 of the first vertical plate 13. Simultaneously, the hooks 371 of the second drive bracket 30 engage in the apertures 151 of the second vertical plate 15 of the front panel 10. Thus, the first and second drive brackets 10, 20 are respectively secured to the first and second vertical plates 13, 15. Simultaneously, the clips 14 of the front panel 10 engage in the corresponding slots 25, 35 of the first and second drive brackets 20, 30. Each clip 14 enters the corresponding recessed portion 26, 36 along the guide slant 262. Finally, the protrusion 142 of the clip 14 engages in the first notches 251 at the corresponding slot 25, 35, and the projection 141 of the clip 14 snappingly engages in the cutout 261 of the corresponding recessed portion 26, 36. Thus, the clips 14 are respectively received in the corresponding recessed portions 26, 36 of the first and second drive brackets 20, 30. The first and second drive brackets 20, 30 are securely attached to the front panel 10.

In the computer enclosure of the present invention, the clips 14 extend through the slots 25, 35 of the recessed portions 26, 36 of the first and second drive brackets 20, 30. The projections 141 of the clips 14 engage with the first top and side panels 23, 22 of the first drive bracket 20 in the cutouts 261 of the recessed portions 26, and with the second top panel and the second bottom and side panels 31, 32 of the second drive bracket 30 in the cutouts of the recessed portions 36. Thus the first and second drive brackets 20, 30 are prevented from moving relative to the front panel 10 in a first direction. In addition, the protrusions 142 of the clips 14 engage with the bent plates 24, 34 of the first and second drive brackets 20, 30 in the first notches 251(, not labeled). Thus the first and drive brackets 20, 30 are prevented from moving relative to the front panel 10 in a second direction perpendicular to the first direction. Furthermore, the catch plates 28 of the first drive bracket 20 engage with the clasps 131 of the first vertical plate 13. The latches 29 of the first drive bracket 20 engage in the second notches 132 of the first vertical plate 13. The hooks 371 of the second drive bracket 30 engage in the apertures 131 of the second vertical plate 15. Thus the first and second drive brackets 20, 30 are prevented from moving relative the front panel 10 in a third direction perpendicular to both the first and second directions.

In an alternative embodiment of the present invention, a third drive bracket may be attached beneath the second drive bracket 30, and a third opening may be defined in the front panel 10 corresponding to the third drive bracket. A structure of the third drive bracket is similar to a structure of the first and second drive brackets 20, 30 respectively, and a structure of the front panel 10 at the third opening is similar to corresponding structures at the first and second openings 11, 12 respectively.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A computer enclosure comprising:
    a front panel defining at least one opening, and comprising a plurality of clips arranged adjacent the at least one opening; and
    at least one drive bracket comprising a bottom panel, a side panel, and a top panel, each of the bottom, side and top panels comprising a bent plate arranged adjacent the front panel, the bent plates defining a plurality of slots corresponding to the clips of the front panel, a recessed portion being formed in the drive bracket near each of the slots;
    wherein the at least one drive bracket is attached to the front panel at the at least one opening, the clips of the front panel extend through the slots of the at least one drive bracket and engage with the recessed portions of the at least one drive bracket.

2. The computer enclosure as described in claim 1, wherein each of the recessed portions defines a cutout, and comprises a guide slant extending into the cutout.

3. The computer enclosure as described in claim 2, wherein a projection is formed on each of the clips, the projection engaging with the at least one drive bracket at a respective cutout thereof.

4. The computer enclosure as described in claim 1, wherein the bent plates each comprise a plurality of slanted portions respectively formed at the slots, a first notch is defined in each of the slanted portions, and each of the clips of the front panel has a protrusion received in a respective first notch.

5. The computer enclosure as described in claim 1, wherein the recessed portions are formed in any one or more of the bottom, side and top panels of the at least one drive bracket.

6. The computer enclosure as described in claim 1, wherein the front panel further comprises at least one vertical plate arranged rearwardly therefrom, the at least one vertical plate comprising a pair of clasps at upper and lower portions thereof, the at least one vertical plate defining a pair of second notches in upper and lower rear portions thereof.

7. The computer enclosure as described in claim 6, wherein the at least one drive bracket further comprises a pair of flanges arranged at the top and bottom panels thereof distal from the side panel thereof.

8. The computer enclosure as described in claim 7, wherein the flanges comprise a pair of catches engaging with the clasps of the at least one vertical plate.

9. The computer enclosure as described in claim 7, wherein the flanges further comprise a pair of latches engaging in the second notches of the at least one vertical plate.

10. The computer enclosure as described in claim 1, wherein each of the clips is generally trapezoid.

11. A computer enclosure comprise:
- a front panel defining at least one opening and comprising a plurality of clips arranged adjacent the at least one opening, each of the clips comprising a projection and a protrusion; and
- at least one drive bracket comprising a plurality of panels defining a space therebetween adapted to receive at least one data storage device therein, each of the panels comprising a bent plate arranged adjacent the front panel, each of the panels further comprising a recessed portion defining a cutout, each of the bent plates comprising a slot and a slanted portion adjacent the slot, the slanted portion defining a notch therein,
- wherein the clips extend through the slots of the recessed portions, the projections engage with the panels of the at least one drive bracket in the cutouts whereby the at least one drive bracket is prevented from moving relative to the front panel in a first direction, and the protrusions engage with the bent plates in the notches whereby the at least one drive bracket is prevented from moving relative to the front panel in a second direction perpendicular to the first direction.

12. The computer enclosure as described in claim 11, wherein the front panel further comprises at least one vertical plate arranged rearwardly therefrom, the at least one vertical plate comprising a pair of clasps at upper and lower portions thereof.

13. The computer enclosure as described in claim 12, wherein the at least one drive bracket further comprises a pair of catches engaging with the clasps of the at least one vertical plate whereby the at least one drive bracket is prevented from moving relative the front panel in a third direction perpendicular to both the first and second directions.

14. A method of making an computer enclosure, comprising the steps of:
- providing a front panel with upper and lower openings extending therethrough in a front-to-back direction;
- attaching upper and lower vertical plates on a rear face of the front panel in alignment with the corresponding upper and lower openings, respectively;
- providing U-shaped upper and lower drive brackets pre-assembled together, each with parallel and opposite top and bottom walls interconnected by a side wall, said side wall being opposite to the corresponding vertical plate after assembled; and
- providing the front panel, the vertical plates and the upper and lower drive brackets with snap-in locking means to allow said pre-assembled upper and lower drive bracket to be secured to the front panel in a back-to-front direction; wherein
- the upper and lower vertical plate cooperate with the U-shaped upper and lower drive brackets to individually define a fully circumferential periphery for fully circumferentially receiving a corresponding data drive therein.

* * * * *